June 2, 1936.   F. E. KEY   2,042,603
TUBE CONNECTING DEVICE
Filed Feb. 14, 1935
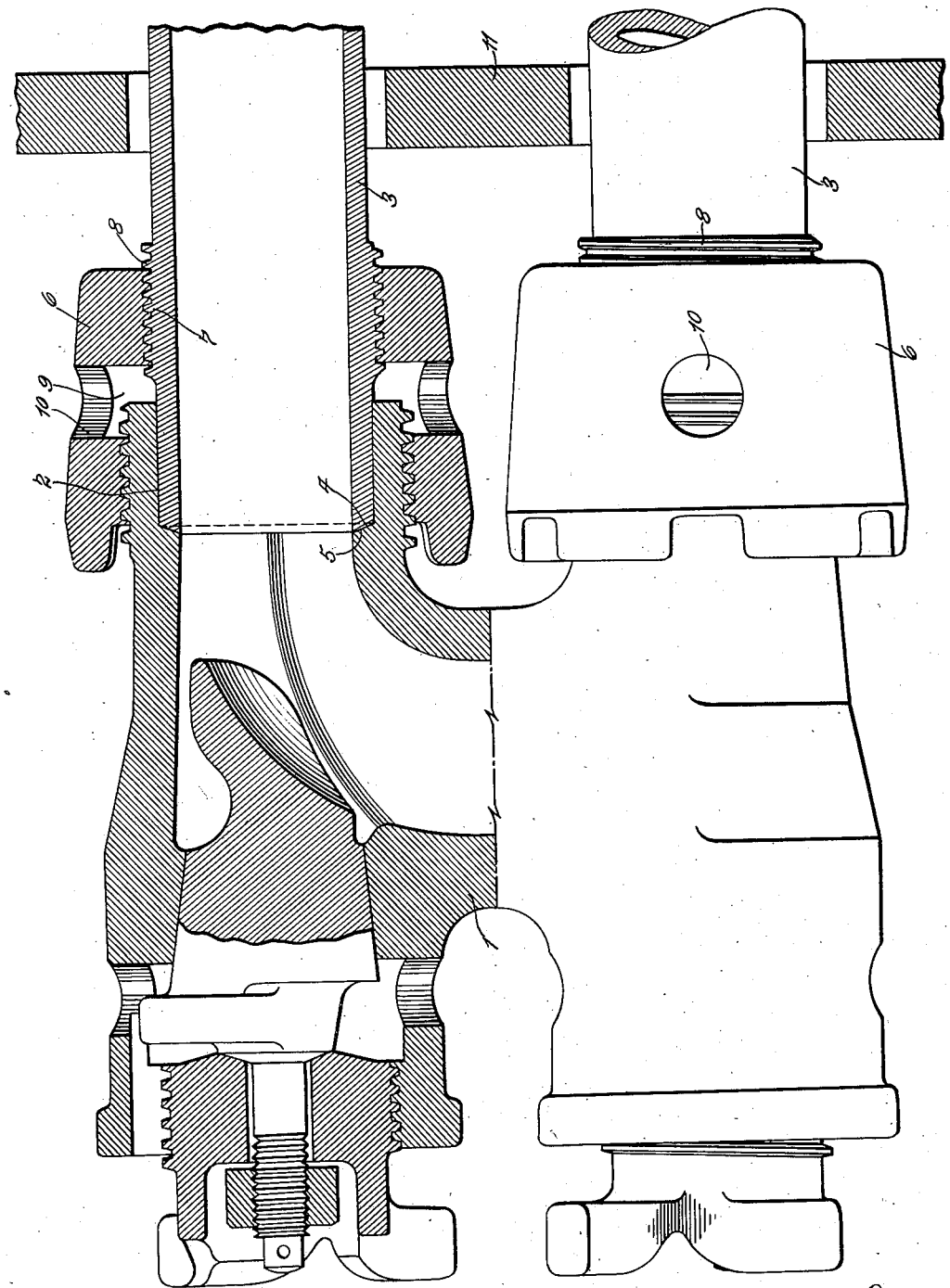
Inventor
Frederick E. Key
by Rippey & Cassidy
His Attorneys Patented June 2, 1936

2,042,603

UNITED STATES PATENT OFFICE 2,042,603

TUBE CONNECTING DEVICE

Frederick E. Key, St. Louis, Mo., assignor to Key Company, a corporation of Missouri Application February 14, 1935, Serial No. 6,423

4 Claims. (Cl. 285—145)

This invention relates to tube connecting devices, and has special reference to a novel construction of and improved method of using thin wall tubing with improved types of fittings or connecting devices.

In my prior application, Serial No. 663,459, filed March 30, 1933, now Patent No. 1,955,003, issued April 17, 1934, a novel type of U-bend fitting or connecting device and novel means for forming and maintaining tight joints between the fitting or connecting device and the tubes are disclosed. The present invention comprises a specifically different type of joint between the respective thin wall tubes and the U-bend fitting and also comprises a novel thread arrangement on the respective tubes for cooperation with the differential sleeve couplings whereby the desired tight joints between the fitting and the tubes may be obtained.

Objects of the present invention are to provide a satisfactory solution of an existing problem arising out of the attempted use of thin wall tubing, and to provide a method and means for obtaining the necessary amount of metal on the tubes in which threads may be cut for engagement with the differential sleeve couplings that are screwed on the adjacent ends of the U-bend or connecting device to hold the latter in proper relationship to the thin wall tubes; to reduce the prevailing excessive cost of upsetting the ends of the tubes and thus reduce the sales resistance encountered because of such excessive cost; and to provide a practicable method and construction whereby thin wall tubing may be satisfactorily employed in connection with the differential sleeve couplings and the improved U-bends or fittings of the general type disclosed in my said prior application, now Patent No. 1,955,003, issued April 17, 1934, as well as other satisfactory types of U-bends or fittings.

Other objects and advantages of the invention should be apparent from the following description, reference being made to the annexed drawing showing in section one of the differential sleeve couplings and the thin wall tubing and associated parts.

The U-bend or fitting device 1 has in each end a socket 2 which receives the adjacent smooth end portion of a thin wall tube 3. The wall of this socket is perfectly smooth and the smooth wall of the tube fits closely against the wall of said socket to form part of a leak-proof joint. The end 4 of the tube 3 is rounded and abuts against a rounded wall 5 at the end of the socket 2 to provide a ball joint which should be perfectly tight and leak-proof when the cooperating differential sleeve couplings 6 are tightened in the manner disclosed in my said prior application. However, should it happen that the joint obtained by tightening the sleeve coupling is not perfectly tight and leak-proof I make use of a tube expander which may be extended into the end of the tube through the U-bend and operated to roll down and expand the end of the tube against the U-bend until a perfectly tight and leak-proof joint is obtained. When assembled in this way the inner surface of the tube 3 is approximately continuous with the inner surface of the U-bend 1, there being no substantial shoulders or irregularities at the joints.

Experience has demonstrated to me that where the walls of the tubes have a thickness of three-eighths of one inch or greater it is practicable to cut on the tube the threads with which the differential couplings 6 are engaged without the necessity of upsetting the tube or providing increased thickened portions and then cutting the threads in said thickened portions. However, when thin wall tubing is used, by which term I include tubing having a lesser thickness than three-eighths of an inch, a portion of the tube spaced from the joint forming end portion thereof is upset or enlarged to provide a circumferentially thickened or enlarged portion 7 on or into which the threads 8 may be cut. The grooves forming the threads 8 do not extend inwardly beyond the plane of the circumference of the tube 3 but said threads are wholly contained on the thickened portion 7.

The thickened portion 7 and the threads 8 are spaced sufficiently from the ball formation 4 at the end of the tube to permit the tube to extend into the socket 2 and seat closely against the wall 5.

In this instance, as in the structure disclosed in my identified prior application, the couplings 6 are provided with internal spaces 9 and with holes 10 opening into said spaces and for the same purpose, and in addition to permit any leakage through the joints to pass through said holes 10 and also to permit loose accumulations of foreign substances to drop out when the fittings are rotated.

In practice the thin wall tube 3 is upset at a desired distance from the end of the tube in order to form a circumferentially raised or thickened portion 7 without changing the thickness of the remaining end portion of the tube which is to be extended into the socket and in close contact with the smooth inner wall of the socket 2 after the threads 8 have been formed. The threads 8 are then formed on or in the thickened portion 7 of the tube differentially with respect to the threads on the adjacent end of the U-bend 1.

The U-bend is applied in the manner shown, the ball end wall 4 of each tube seating against the correspondingly shaped wall 5 in the U-bend while the peripheral surface of each tube fits closely against the inner surface of the socket 2. The parts are drawn to this close adjustment by screwing the sleeve couplings 6 outwardly along the threads 8 and onto the threaded ends of the U-bends until the parts assume the portion and relationship shown in the drawing, forming a tight joint at the abutting walls 4 and 5 and between the contacting surfaces of the tubes and the sockets in the U-bends.

This method of designing and forming threaded tubes where the thread is cut into the surface of the tube leaves no over diameter, making it unnecessary to form extra large holes through the tube support sheet 11. This is an additional advantage because where the holes through the tube support sheet are of over diameter it is necessary in most cases to employ split bushings in the holes in order to hold the tubes in central positions in the holes.

It must now be clear that my invention attains all of its intended objects and purposes efficiently, satisfactorily and economically, making it possible to use thin wall tubing provided with external threads for engagement by the differential sleeve couplings, which are operative to draw and hold the parts in tight joint forming relationship.

I do not restrict myself in unessential particulars, but what I claim and desire to secure by Letters Patent is:

1. A device for connecting adjacent ends of adjacent tubes of uniform inside diameter throughout and having thin walls provided with smooth end walls and with smooth outer walls around their end portions comprising a U-bend having sockets in its ends of the same inside diameter as the outside diameter of said end portions and provided with smooth inner peripheral walls and receiving said end portions of said tubes and having smooth walls at the ends of said sockets abutting against the ends of said tubes and cooperating with all of said smooth walls to form leak-proof joints, the inside diameter of said tubes and said U-bend at said joints being equal, upset thickened portions formed circumferentially around said tubes a distance from the ends of said smooth wall end portions that extend into said sockets and having threads thereon wholly beyond the peripheries of the tubes, and differential sleeve couplings screwed on said threads on said tubes and on differential threads on adjacent ends of said U-bend and holding said end walls of said sockets clamped closely against said ends of said tubes.

2. A device for connecting adjacent ends of adjacent tubes having thin walls provided with smooth outer walls around their end portions comprising a U-bend having sockets in its ends provided with smooth walls and fitting closely on said smooth wall end portions of said tubes, abutting curved walls at the ends of said sockets and said tubes cooperating with all of said smooth walls to form tight joints, the inside diameter of said tubes and said U-bend at said joints being equal, upset thickened integral circumferential portions on said tubes at a distance from the ends of said tubes that extend into said sockets and from the ends of said U-bend and having threads thereon wholly beyond the peripheries of the tubes, and differential sleeve couplings screwed on said threads on said tubes and on differential threads on adjacent ends of said U-bend and holding said U-bend and said tubes in a relationship in which said walls at the ends of said tubes and said socket walls form tight joints.

3. A device for connecting adjacent ends of adjacent tubes having thin walls comprising a U-bend having sockets in its ends provided with smooth walls and fitting closely on smooth wall end portions of said tubes, abutting curved walls at the ends of said sockets and said tubes and cooperating with all of said smooth walls to form tight joints, upset thickened integral circumferential portions on said tubes at a distance from the ends of said tubes that extend into said sockets and from the ends of said U-bend and having threads thereon wholly beyond the peripheries of the tubes, differential sleeve couplings screwed on said threads on said tubes and on differential threads on adjacent ends of said U-bend and holding said U-bend and said tubes in a relationship in which said walls at the ends of said tubes and said socket walls form tight joints, the inside diameter of said tubes and said U-bend at said joints being equal, and means in said couplings for receiving and discharging substances passing beyond the ends of said U-bend.

4. A device for connecting adjacent ends of adjacent thin wall tubes comprising a U-bend having sockets in its ends with rounded walls at the bottoms thereof and receiving and fitting closely against the outer peripheries of expanded end portions of said tubes, integral upset thickened portions circumferentially around said tubes beyond said end portions that extend into said sockets, differential threads on said upset portions of said tubes and the end portions of said U-bends respectively, and differential sleeve couplings screwed on said threads and holding said U-bend in tight joint forming relationship with the end portions of said tubes respectively, the inside diameter of said tubes and said U-bend at said joints being equal.

FREDERICK E. KEY.